(12) United States Patent
Unoki et al.

(10) Patent No.: US 7,941,729 B2
(45) Date of Patent: May 10, 2011

(54) DATA STORAGE DEVICE AND ERROR PROCESSING METHOD IN ITS READ PROCESSING

(75) Inventors: Toshiroh Unoki, Kanagawa (JP); Minoru Hashimoto, Kanagawa (JP); Toru Aida, Kangawa (JP); Naoki Tajima, Kanagawa (JP); Hiroshi Kawanobe, Kanagawa (JP)

(73) Assignee: Hitachi Global StorageTechnologies, Netherlands B.V., Amsterdam (NL)

( * ) Notice: Subject to any disclaimer, the term of this patent is extended or adjusted under 35 U.S.C. 154(b) by 1020 days.

(21) Appl. No.: 11/807,155

(22) Filed: May 24, 2007

(65) Prior Publication Data

US 2007/0273995 A1 Nov. 29, 2007

(30) Foreign Application Priority Data

May 24, 2006 (JP) ................................. 2006-143919

(51) Int. Cl.
*G11C 29/00* (2006.01)
(52) U.S. Cl. ........................................ 714/768; 714/770
(58) Field of Classification Search .................. 714/768, 714/770
See application file for complete search history.

(56) References Cited

U.S. PATENT DOCUMENTS

| 5,487,077 | A | * | 1/1996 | Hassner et al. ............... 714/762 |
| 5,844,920 | A | | 12/1998 | Zook et al. |
| 6,147,826 | A | | 11/2000 | Hashimura et al. |
| 6,357,030 | B1 | * | 3/2002 | Demura et al. ............... 714/755 |
| 7,123,577 | B2 | * | 10/2006 | Horibe ........................ 369/275.3 |
| 2004/0193792 | A1 | * | 9/2004 | Horibe ........................... 711/112 |
| 2006/0203642 | A1 | * | 9/2006 | Kakimoto et al. ......... 369/47.31 |
| 2007/0002700 | A1 | * | 1/2007 | Horibe ........................ 369/30.07 |

FOREIGN PATENT DOCUMENTS

| JP | 10-255400 | 9/1998 |
| JP | 11-353818 | 12/1999 |

* cited by examiner

*Primary Examiner* — M. Mujtaba K Chaudry

(57) ABSTRACT

Embodiments in accordance with the present invention help a disk drive to effectively cope with a data address mark detection error. In one embodiment, a data sector is provided with plural data address marks and an read/write (RW) channel reads out the data sector using part of those data address marks. Each divisional section of a split sector has two data address marks and the RW channel uses one of the two data address marks. A data address mark to be used is specified by a register. When an error occurs in detecting a data address mark, its position is stored in a register. Based on the error position, an error recovery processing section stores, in the register, a data address mark to be used in a next retry.

13 Claims, 9 Drawing Sheets

DATA STORAGE DEVICE AND ERROR PROCESSING METHOD IN ITS READ PROCESSING

CROSS-REFERENCE TO RELATED APPLICATION

The instant nonprovisional patent application claims priority to Japanese Application No. 2006-143919 filed May 24, 2006 and incorporated by reference in its entirety herein for all purposes.

BACKGROUND OF THE INVENTION

Data storage devices are known which use various forms of media such as an optical disc, a magnetic tape, and a semiconductor circuit. Among those devices, the hard disk drive (HDD) has come into wide use as a storage device of a computer and is one of the storage devices that are indispensable for current computer systems. Because of its superior characteristics, the use of the HDD is not limited to computers, but is rapidly expanding to moving image recording/reproducing devices, vehicle navigation systems, cell phones, removable memories used in digital cameras etc., and other devices.

A magnetic disk used in the HDD has plural concentric tracks. Plural pieces of servo data having address information and data sectors including user data are recorded on each track. A head element unit accesses a desired data sector according to the address information of servo data, whereby data writing to or data reading from the data sector can be performed.

Each data sector has a data address mark indicating a start position of its user data. If a data address mark cannot be detected, the user data of the corresponding data sector cannot be read out. A format for solving this problem is known in which each data sector has plural data address marks (refer to Japanese Patent Publication No. 10-255400 "Patent document 1", for example). Even if the first data address mark cannot be detected, the user data of the data sector concerned can be read out by performing reading by use of the following data address mark and performing data correction processing.

There may occur a case that one data sector is divided into two or more sections by servo data. Such a data sector is called a split sector. An HDD using two data address marks has two data address marks in each section of a split sector. In reading out the user data of each section, one data address mark included therein is used.

There exists a channel circuit which is different from a channel circuit of Patent document 1 which continues data read processing by automatically using a data address mark that is different from a data address mark that has caused an error. The former channel circuit performs sector read processing using only data address marks that are specified in advance. In the channel circuit which uses specified data address marks, data processing is stopped upon occurrence of an error in detecting a data address mark. A controller is required to inform the channel circuit of a data address mark to be used in the next retry. Where as described above a sector is divided into two sections, the split sector has four data address marks. When an error has occurred in detecting a data address mark, the controller informs the channel circuit of a data address mark that is different from the one that has caused the error.

However, if the controller receives only the information that an error has occurred in detecting a data address mark, the controller is required to make three retries at the maximum. A specific example will be described below. Assume that the first section of a split sector has first and second data address marks and the second section has third and fourth data address marks, and that the channel circuit uses the first and third data address marks as default marks.

When an error has occurred in detecting a data address mark, the controller makes retries in order for three combinations, that is, first and fourth data address marks, second and fourth data address marks, and second and third data address marks. Therefore, the controller makes three retries at the worst case.

To increase the capacity of an HDD, it has been proposed to increase the data size of each data sector. The current size of each data sector is 512 bytes. Increasing the data size from this value makes it possible to decrease the amount of data other than user data and thereby allows the magnetic disk to store more user data. More specifically, it has been proposed to set the data size of each data sector at 4 Kbytes.

When the data size of each data sector is increased as described above, the number of sections of each split sector increases and the number of data address marks increases accordingly. The increase in the number of data address marks results in increase in the number of combinations of data address marks for which retry processing is performed upon occurrence of an error in detecting a data address mark and hence is a factor in causing delay of the retry processing.

BRIEF SUMMARY OF THE INVENTION

Embodiments in accordance with the present invention allow a disk drive to effectively cope with a data address mark detection error. In the particular embodiment shown in FIG. 4, a data sector is provided with plural data address marks, and an read/write (RW) channel 21 reads out the data sector using part of those data address marks. Each divisional section of a split sector has two data address marks and the RW channel 21 uses one of the two data address marks. A data address mark to be used is specified by a register 221. When an error occurs in detecting a data address mark, its position is stored in a register 222. Based on the error position, an error recovery processing section 234 stores, in the register 221, a data address mark to be used in a next retry.

DETAILED DESCRIPTION OF THE INVENTION

Figure 1:
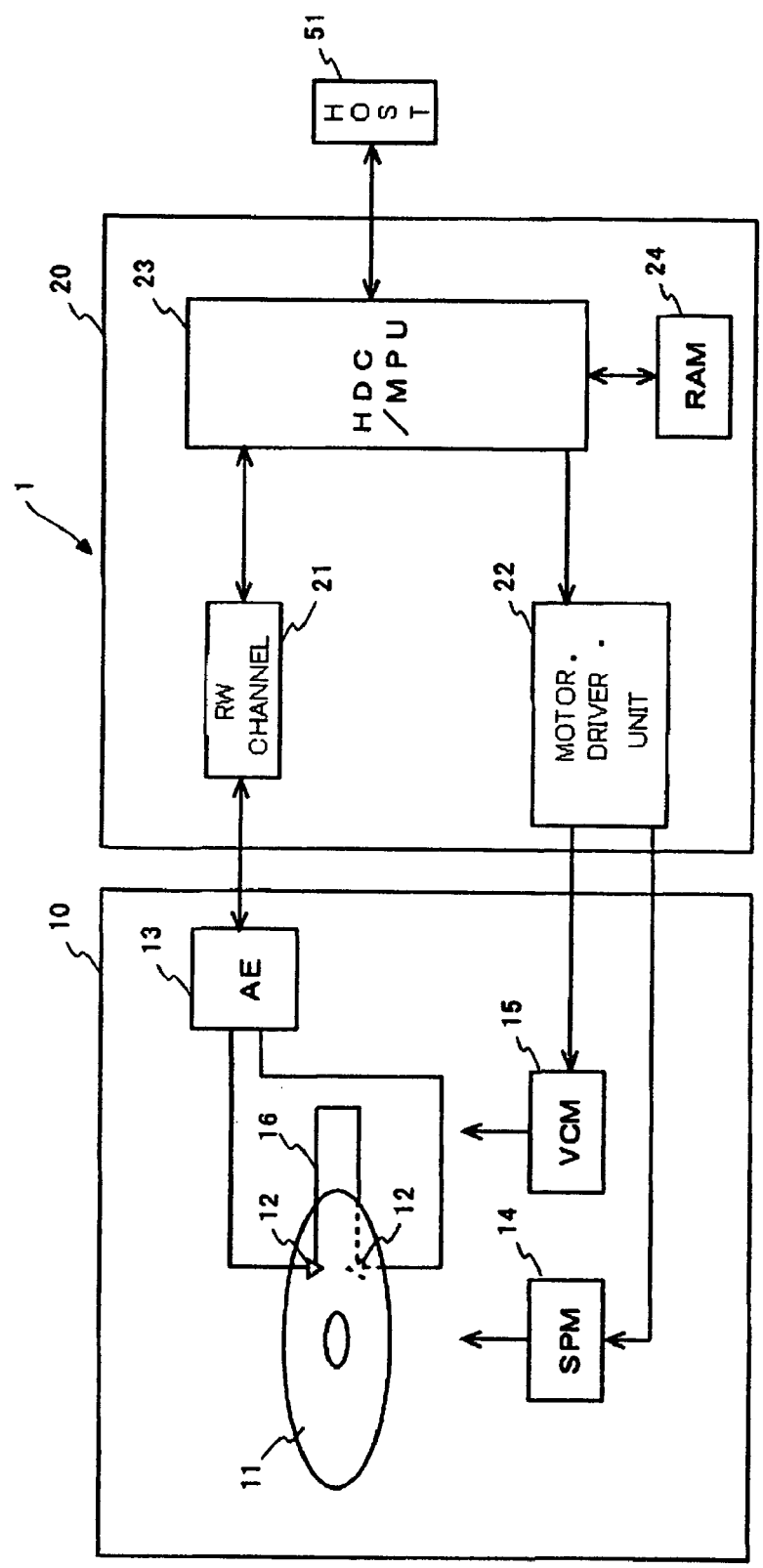
FIG. 1 is an exemplary block diagram schematically showing the entire configuration of an HDD according to an embodiment of the present invention.

Embodiments in accordance with the present invention relate to a data storage device and an error processing method in its read processing. In particular, embodiments of the present invention relate to read processing on a medium in which each data sector includes plural data address marks.

One aspect of embodiments in accordance with the present invention provides a data storage device which reads out user data from a medium on which user data are recorded. The data storage device comprises a channel circuit and a controller for controlling read processing. The channel circuit locates, in read processing on a data sector, a start position of user data using part of data address marks that are included in the data sector and located at different positions, and performs data processing on the user data. The controller executes an error process on the basis of a position of a data address mark that is judged to have caused a detection error when the error has occurred in the channel circuit's detecting the part of the data address marks in the read processing. Since the position of the data address mark that has caused the detection error is located and an error process is executed on the basis of the located position, the error process may be made more effective.

The channel circuit locates the position of the data address mark that has caused the error when the error has occurred in detecting the part of the data address marks. And the controller may acquire data indicating the position from the channel circuit and execute the error process using the acquired data. Since the channel that uses the data address marks locates the position of the data address mark that has caused the error, this processing may be performed efficiently.

In the error process, the controller designates, as a data address mark to be used for locating a start position of the user data, a data address mark that is different in position from the data address mark that has caused the error. The channel circuit may read out the data sector again using the data address mark that is located at the position specified by the controller. This makes it possible to increase the efficiency of retry processing.

The data sector is divided into plural sections by one piece or plural pieces of servo data, each of the divisional sections includes plural data address marks in itself, and the channel circuit may locate a start position of user data using part of the plural data address marks in each section and perform data processing on the user data. This makes it possible to effectively cope with a data address mark detection error when it has occurred in a split sector. Furthermore, in the error process, the controller designates, as a data address mark to be used for locating a start position of the user data in a section, a data address mark that is different in position in the same section from a data address mark that has caused an error. And the channel circuit may read out the data sector again using the data address mark that is located at the position specified by the controller. This makes it possible to increase the efficiency of retry processing.

Alternatively, the position of the data address mark that has caused the detection error may be located on the basis of the number of times of variation, in one data sector, of a read control signal which is output from the controller to the channel circuit and varies on a section-by-section basis. This makes it possible to locate a data address mark error position by a simple configuration. Furthermore, the channel circuit comprises a counter for counting the number of times of variation of the read control signal and locates the position of the data address mark that has caused the detection error in accordance with a resulting count. The controller may acquire, from the channel circuit, data indicating the position of the above data address mark and execute the error process using the acquired data. This makes it possible to locate a data address mark error position by a simple configuration.

The controller may execute an error correcting process on the user data on the basis of the position of the data address mark that has caused the detection error. This makes it possible to increase the error correction ability and thereby enable an efficient error correcting process.

The channel circuit may further make a search as to whether or not a detection error occurs in detecting data address marks that are different from the data address mark that has caused the detection error. This makes it possible to efficiently identify data address marks that cause a detection error. Furthermore, the channel circuit may make a search as to whether or not a detection error occurs in detecting data address marks that are different from the data address mark that has caused the detection error by again reading the data sector including the data address mark that has caused the detection error. This enables a control that is suitable for ordinary read processing and processing of identifying data address marks that cause a detection error.

Another aspect of embodiments in accordance with the present invention provides an error processing method in data reading from a medium on which user data are recorded. In this method, in read processing on a data sector, a start position of user data is located by using part of data address marks that are included in the data sector and located at different positions, and data processing is performed on the user data. In the read processing, a position of a data address mark that has caused an error is located when the error has occurred in detecting the part of the data address marks. A retry of reading of the data sector is made by using a data address mark that is different in position from the position-located data address mark. Since a retry of reading of the data sector is made by using a data address mark that is different in position from the position-located data address mark, the efficiency of the retry processing may be increased.

Embodiments of the present invention make it possible to execute an effective error process for coping with a data address mark detection error when reading a data sector.

An application of an embodiment of the present invention will be hereinafter described. To clarify the description, omission and simplification may be made in the following description and drawings where appropriate. The same components are given the same symbol in the drawings, and redundant explanations will be omitted when doing so is necessary to clarify the description.

One embodiment relates to detection of data address marks for locating the position of user data in a data sector which is a unit of recording of user data. Each data sector is provided with plural data address marks, and reading of the data sector is performed by using part of those data address marks. When a data address mark cannot be detected, the position of the undetected data address mark is located and an error process is executed by using the information of the error position.

An embodiment of the present invention will be described below for a hard disk drive (HDD) which is an exemplary data storage device. To facilitate understanding of important features of the embodiment, the entire configuration of an HDD will be described first. FIG. 1 is an exemplary block diagram schematically showing the entire configuration of an HDD 1 according to the embodiment. As shown in FIG. 1, the HDD 1 is equipped with, in an enclosure 10, a magnetic disk 11 as an exemplary medium (recording medium), head element units 12, arm electronic circuit (AE) 13, a spindle motor (SPM) 14, a voice coil motor (VCM) 15, and actuators 16.

The HDD 1 is equipped with a circuit board 20 which is fixed to the outside of the enclosure 10. ICs such as a read/write channel (RW channel) 21, a motor driver unit 22, an integrated circuit (hereinafter referred to as "HDC/MPU") 23 of a hard disk controller (HDC) and an MPU, and a RAM 24 which is an example of a semiconductor memory are provided on the circuit board 20. The above circuits may be integrated into a single IC or implemented as plural ICs.

The SPM 14 rotates, at a prescribed angular speed, the magnetic disk 11 fixed to it. The motor driver unit 22 drives the SPM 14 according to control data that are supplied from the HDC/MPU 23. The magnetic disk 11 of this example has, on both sides, a recording surface on which to record data, and the head element units 12 are provided for the respective recording surfaces.

Each head element unit 12 is fixed to a slider (not shown). Each slider is fixed to the actuator 16. Coupled to the VCM 15, the actuator 16 moves the head element unit 12 (and the slider) in the radial direction over the magnetic disk 11 by rotating on a rotary shaft. The motor driver unit 22 drives the VCM 15 according to control data that are supplied from the HDC/MPU 23. Each head element unit 12 is typically equipped with a write element for converting an electric signal into a magnetic field according to write data and a read element for converting a magnetic field of the magnetic disk 11 into an electric signal. Satisfactory results may be obtained as long as one or more magnetic disks 11 are provided, and a recording surface may be formed on one or both sides of the magnetic disk 11. Embodiments of the present invention may be applied to a data storage device having only a read element.

The AE 13 selects one head element unit 12 to perform data access from the plural head element units 12, amplifies (with a preamplifier), at a certain gain, a reproduction signal that is produced by the selected head element unit 12, and sends it to the RW channel 21. Or the AE 13 sends, to the selected head element unit 12, a recording signal that is supplied from the RW channel 21.

In write processing, the RW channel 21, which is an example of a channel circuit, code-modulates write data that are supplied from the HDC/MPU 23, converts the code-modulated write data into a write signal, and supplies it to the AE 13. In read processing, the RW channel 21 amplifies a read signal that is supplied from the AE 13 so that it will have a certain amplitude, extracts data from the acquired read signal, and performs decoding processing. Read-out data include user data and servo data. The decoded read data are supplied to the HDC/MPU 23. The RW channel 21 of the embodiment is characterized in the manner of use of data address marks in each data sector, which will be described later in detail.

In the HDC/MPU 23, the MPU operates according to microcode which is loaded in the RAM 24. Upon activation of the HDD 1, not only the microcode which runs on the MPU, but also data that are necessary for control and data processing, are loaded into the RAM 24 from the magnetic disk 11 or a ROM (not shown). The HDC is a logic circuit and performs various kinds of processing together with the MPU. For example, the HDC/MPU 23 performs processing necessary for data processing for management of command execution order, positioning control on the head element units 12, interface control, defect management, etc. as well as controls the entire HDD 1. The HDC/MPU 23 of the embodiment is characterized in an error process that it executes to cope with an error that has occurred in detecting a data address mark in read processing, which will be described later in detail.

The HDC/MPU 23 transfers, to a host 51, read data that originates from the magnetic disk 11 and are acquired from the RW channel 21. The read data that originate from the magnetic disk 11 are temporarily stored in a read buffer in the RAM 24 and then transferred to the host 51 via the HDC/MPU 23. On the other hand, write data supplied from the host 51 are temporarily stored in a write buffer in the RAM 24 via the HDC/MPU 23 and then transferred to the magnetic disk 11 via the HDC/MPU 23 with prescribed timing.

Figure 2:
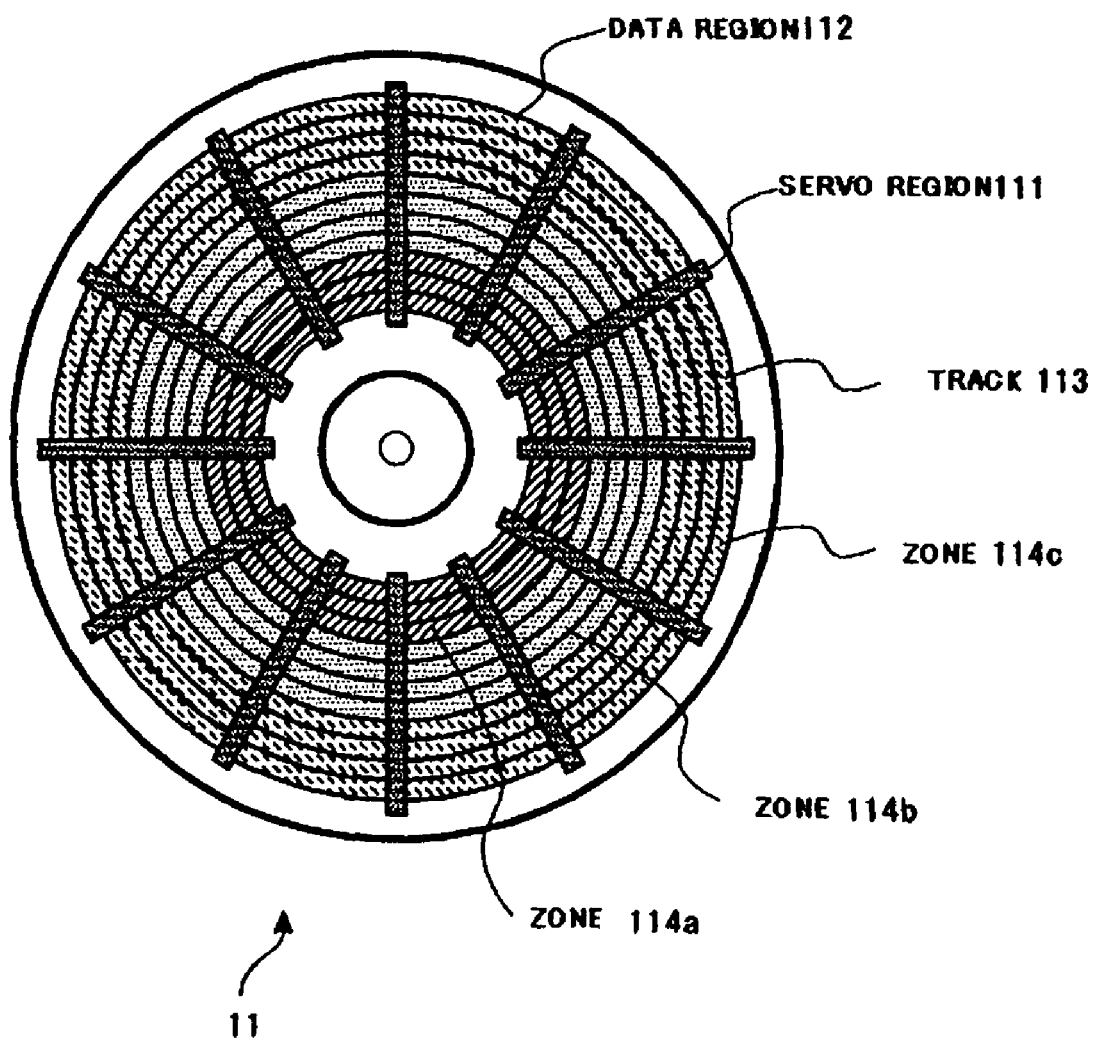
FIG. 2 schematically shows an exemplary physical format of data recorded on a magnetic disk according to an embodiment of the present invention.

Recorded data on the magnetic disk 11 will be described below with reference to FIG. 2. FIG. 2 schematically shows how recorded data are arranged on the recording surface of the magnetic disk 11. Plural servo regions 111 which extend radially from the center of the magnetic disk 11 in radial directions and formed at prescribed angular intervals, and data regions 112 each of which is formed between two adjoining servo regions 111, are formed on the recording surface of the magnetic disk 11. The servo regions 111 and the data regions 112 are provided alternately at prescribed angles. Servo data for positioning control on the head element unit 12 are recorded in each servo region 111. User data are recorded in each data region 112.

Plural concentric data tracks 113 each of which has a prescribed width in the radial direction are formed on the recording surface of the magnetic disk 11. User data are recorded along each data track 113. Plural concentric servo tracks are formed on the recording surface of the magnetic disk 11, and each servo track consists of portions, located at the same radial position, of the servo regions 111. The servo track pitch is the same as or different from the data track pitch.

In each data track 113, user data are recorded on a data sector basis. A data format of the data sector will be described later in detail. The data tracks 113 are grouped into plural zones 114a-114c according to their radial positions on the magnetic disk 11. The number of sectors included in each data track 113 is set for each zone.

Figure 3:
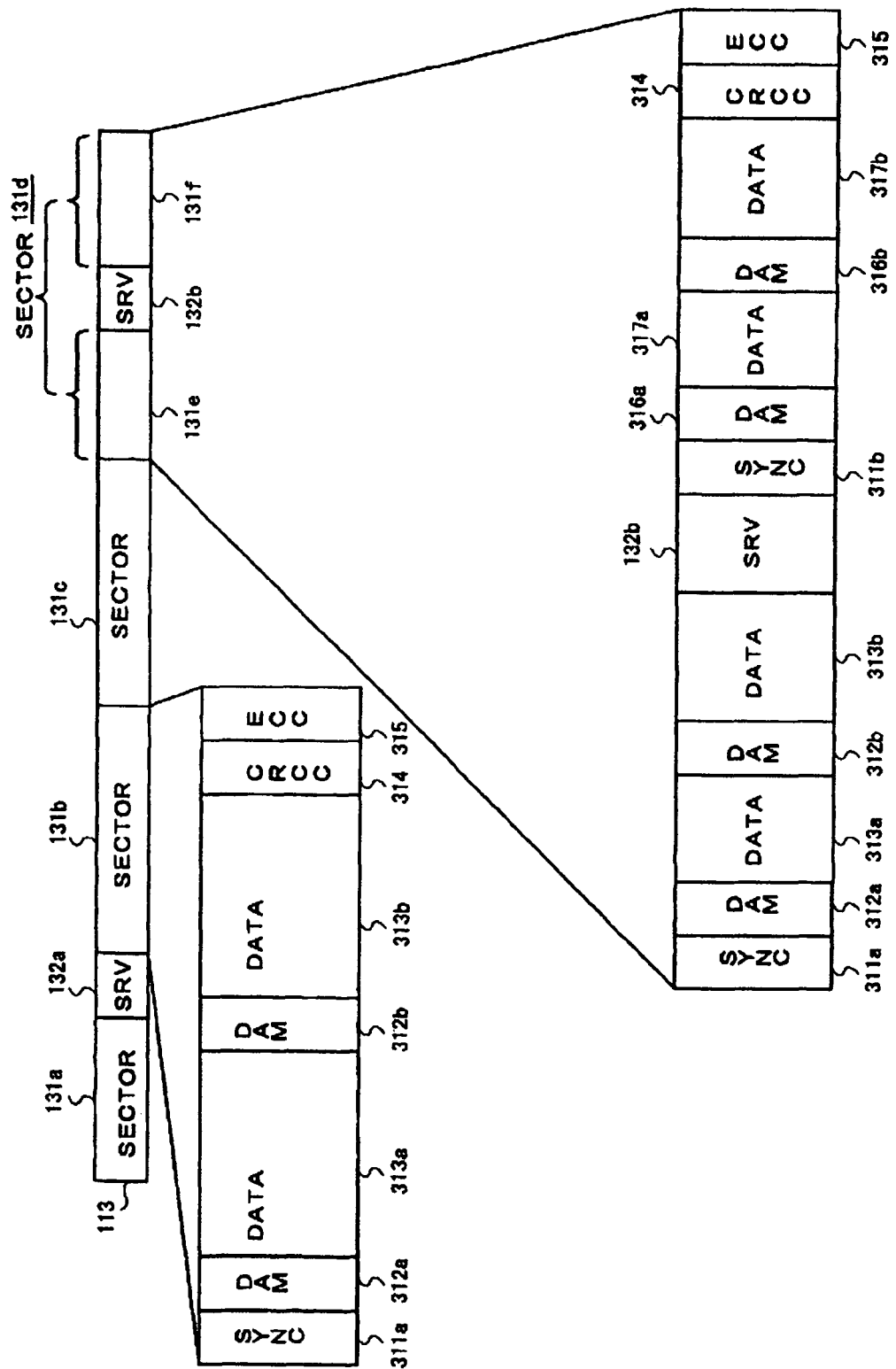
FIG. 3 schematically shows an exemplary physical format of data recorded on a track of the magnetic disk according to an embodiment of the present invention.

FIG. 3 schematically shows an exemplary physical format of data recorded on a data track. In this example, the data track 113 is provided with plural data sectors (SECTOR); four data sectors 131a-131d are shown as examples in FIG. 3. Servo data (SRV) 132 are disposed at regular intervals so as to be located between data sectors or to divide a data sector. Two servo data 132a and 132b are shown as examples in FIG. 3.

The data sectors 131 on the data tracks 113 may be classified into two types. One is a split sector which is divided by servo data 132, and the other is an ordinary data sector (non-split sector) which is not divided. In the example of FIG. 3, the data sectors 131a-131c are not divided by any of the servo data 132 and hence are ordinary data sectors. On the other hand, the data sector 113d is divided by the servo data 132b and hence is a split sector.

As shown in FIG. 3, the non-split sector and the split sector have different data formats. FIG. 3 shows a data format of the data sector 131b as a non-split sector. The data sector 131b of this example has two data address marks (DAMs). A data address mark will be hereinafter referred to as "DAM." One data sector has plural DAMs. Therefore, even if an error occurs in detecting one DAM, the user data may be read out by using the other DAM.

Specifically, the data sector 131b is provided with a sync (SYNC) 311a, a first DAM 312a, a first user data section 313a, a second DAM 132b, a second user data section 313b, a CRCC (cyclic redundancy check code) 314, and an ECC code (error correction code) 315. The sync 311 is a signal having a certain frequency, and a PLL circuit of the RW channel 21 operates so as to be synchronized with the sync 311. A VGA (variable gain amplifier) of the RW channel 21 adjusts its gain so that the amplitude of its output becomes equal to an expected value when the sync 311 is input to it.

In the example of FIG. 3, the CRCC 314 and the ECC 315 are codes that are added for error correction. The CRCC 314 and the ECC 315 are added to correct an error that may occur when the data are recorded on the magnetic disk 11. The HDC/MPU 23 performs error correction processing on readout data using the ECC 315. To prevent erroneous detection that may occur with the ECC code 315 at a very low probability, the HDC/MPU 23 uses the CRCC 314 for a verification of error detection. Reed-Solomon code is typically used for generation of the ECC 315 and the CRCC 314. ECC processing on user data will be described later.

As described above, the data sector 131b is provided with the plural DAMs. The data sector 131b has the first DAM 312a before the first user data section 313a and has the second DAM 312b before the second user data section 313b. The first and second user data sections 313a and 313b are data that were transferred from the host 51.

The DAM indicates the start of user data, that is, it is sync data for reading of the user data following it. The RW channel 21 reads out user data following a DAM on condition that the DAM has been detected. More specifically, the RW channel 21 performs read processing on the data sector 131b using one of the first DAM 312a and the second DAM 312b. A method for using the first DAM 312a and the second DAM 312b in the RW channel 21 will be described later in detail.

The split sector 131d is divided into two sector sections 131e and 131f by the servo data 132b. The first sector section 131e is located immediately before the servo data 132b and the second sector section 131f is located immediately behind the servo data 132b. Each of the first and second sector sections 131e and 131f has a sync, two DAMs, and two user data sections, and hence the split sector 131d has four DAMs and four user data sections.

More specifically, the first sector section 131e has a sync 311a, a first DAM 312a, a first user data section 313a, a second DAM 312b, and a second user data section 313b. Likewise, the second sector section 131f has a sync 311b, a first DAM 316a, a first user data section 317a, a second DAM 316b, and a second user data section 317b. The second sector section 131f further has a CRCC 314 and an ECC 315.

In reading of the first sector section 131e, one of the first and second DAMs 312a and 312b that are included therein is used. In reading of the second sector section 131f, one of the first and second DAMs 316a and 316b that are included therein is used. Error correction processing is performed for the entire split sector 131d, and only the second sector section 131f which is the last sector section, has the ECC 315 and the CRCC 314.

Figure 4:
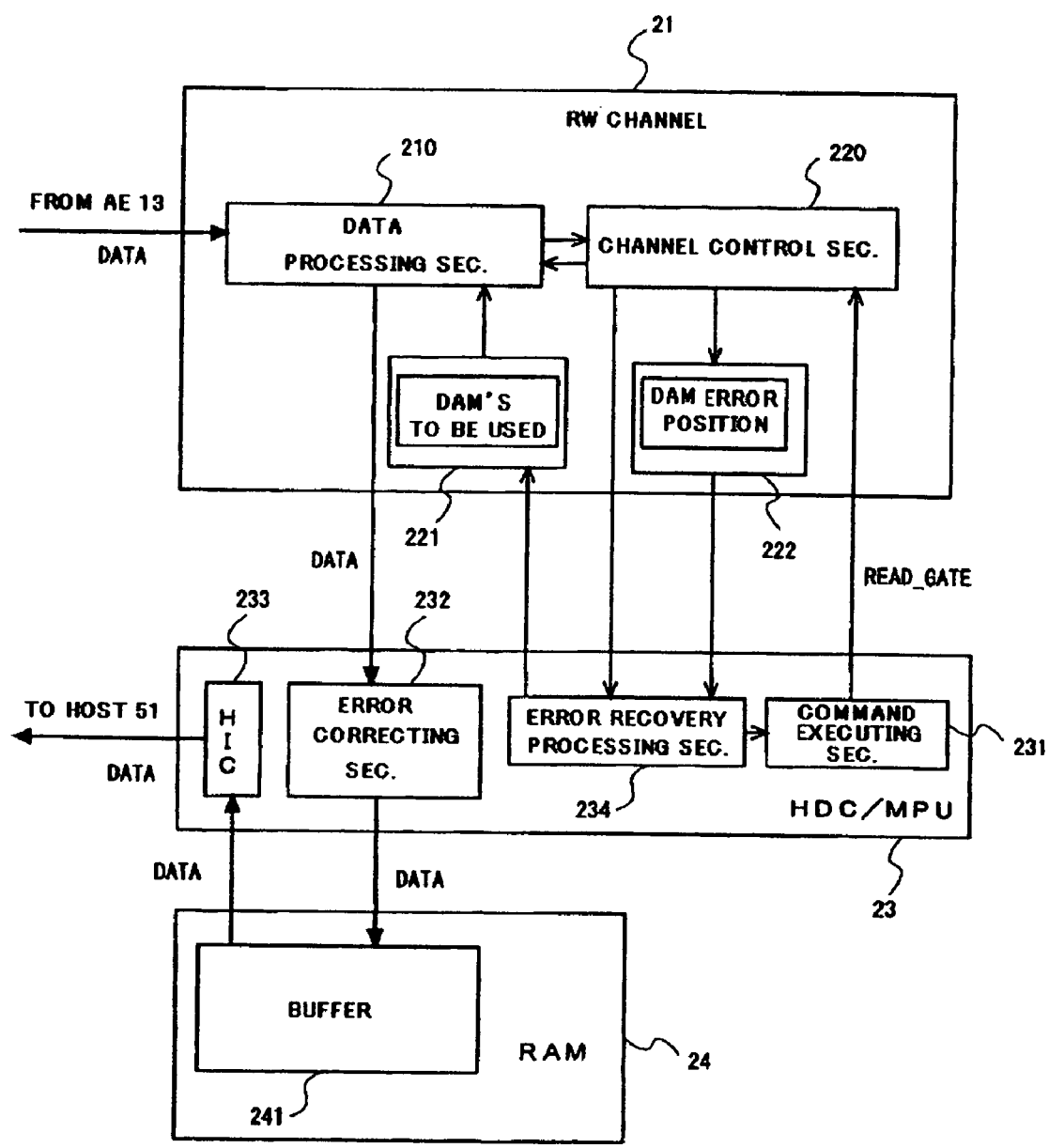
FIG. 4 is an exemplary block diagram schematically showing respective logic components which executes a process for coping with a DAM detection error in accordance with one embodiment.

FIG. 4 is an exemplary block diagram schematically showing the logic configuration relating to a read process in the HDD 1 according to the embodiment. As shown in FIG. 4, the RW channel 21 has a data processing section 210 for performing processing of reading out data from the magnetic disk 11 and a channel control section 220 for controlling the data read processing of the data processing section 210 and the entire RW channel 21.

Figure 5:
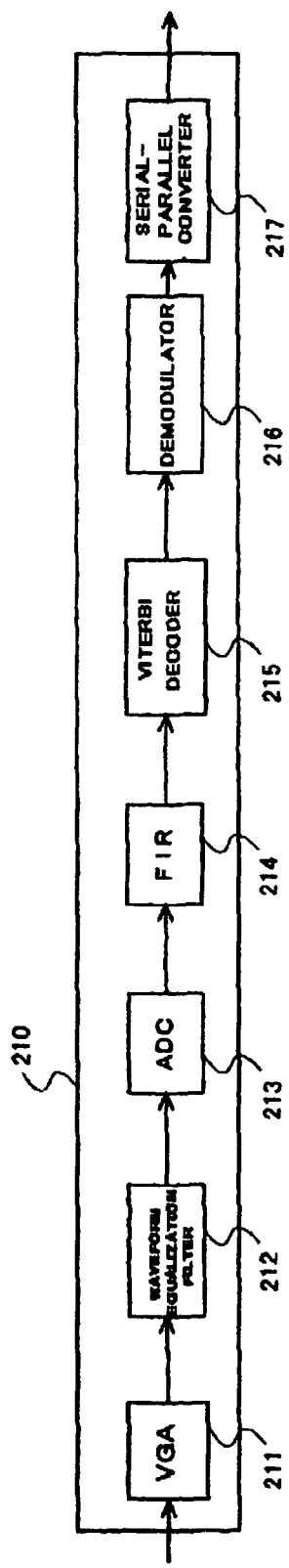
FIG. 5 schematically shows an exemplary configuration which relates to a data sector read process of a data processing section of an RW channel in accordance with one embodiment.

FIG. 5 schematically shows an exemplary configuration which relates to a data sector read process of the data processing section 210. The data processing section 210 has a variable gain amplifier (VGA) 211, a waveform equalization filter 212, an AD converter 213, an FIR filter 214, a Viterbi decoder 215, a demodulator 216, a serial-parallel converter 217, etc. A read signal supplied from the AE 13 is input to the waveform equalization filter 212 via the variable gain amplifier (VGA) 211 for AGC (auto gain control). The waveform equalization filter 212 performs waveform equalization processing for eliminating noise from the input analog signal and slimming the signal waveform. The waveform-equalized signal is sampled and quantized by the AD converter 213 and thereby converted into a digital signal, which is input to the FIR filter 214.

The FIR filter 214 performs transversal equalization processing on the digital signal. More specifically, to restore data correctly, the FIR filter 214 shapes the input waveform and equalizes the input waveform to a target waveform. The Viterbi decoder 215 processes, with a PRML (partial response maximum likelihood) processing circuit, the waveform that has been equalized by the FIR filter 214 and outputs an RLL (run length limited) signal. The Viterbi decoder 215 determines a maximum likelihood data sequence according to a prescribed algorithm on the basis of the context of the input data sequence. The demodulator 216 demodulates the RLL signal that has been produced by the Viterbi decoder 215 through decoding, into an original signal. The demodulated serial data are converted by the serial-parallel converter 2127 into parallel data, which are transferred to the HDC/MPU 23.

The HDD 1 according to the embodiment is characterized in the read processing control on user data using DAMs. An ordinary read process that is executed on the data sector 131b will be described below with reference to FIGS. 3 and 4. A command executing section 231 controls read processing according to a read command that is supplied from the host 51. More specifically, the command executing section 231 sets the RW channel 21 in a read mode by outputting a read control signal READ_GATE to the channel control section 220 and making it active. Then, the command executing section 231 commands reading of the data sector. That is, when the read control signal READ_GATE is active, the data processing section 210 takes in a read signal that is supplied from the AE 13 and performs prescribed signal processing and code processing.

The data processing section 210 refers to data stored in a register 221, and uses, for read data processing, a DAM that is indicated by the data. In this example, the first DAM 312a is set in advance as a DAM to be used. Upon detecting the first DAM 312a, the data processing section 210 locates the start position of the first user data section 313a using it and performs data processing on the first and second user data sections 313a and 313b.

The data processing section 210 transfers processed read data to the HDC/MPU 23. The HDC/MPU 23 functions as the command executing section 231, an error correcting section 232, a host interface controller (HIC) 233, and an error recovery processing section 234. Each block is a functional block, and the MPU which operates according to hardware and/or microcode serves as each functional block.

The error correcting section 232 performs error correction processing on the user data 313a and 313b using the ECC 315 and the CRCC 314 of the read data that have been processed by the data processing section 210. The error-corrected user data 313a and 313b are temporarily stored in a buffer 241 in the RAM 24 and then transferred to the host 51 via the HIC 233.

Next, a description will be made of an error process that is executed by the HDC/MPU 23 when the first DAM 312a cannot be detected. The HDC/MPU 23 serves as a controller for performing processing for coping with the error when an error has occurred in detecting the DAM. When the first DAM 312a cannot be detected, the data processing section 210 communicates that result to the channel control section 220 and suspends the data processing. The channel control section 220 informs the HDC/MPU 23 of the error in detection of the first DAM 312a. Furthermore, the channel control section 220 stores, in a register 222, data that indicates the position of the DAM that has caused the detection error. In this example, data indicating the first DAM 312a is stored.

Receiving the above information, the error recovery processing section 234 instructs the RW channel 21 to use the second DAM 312b instead of the first DAM 312a. More specifically, the error recovery processing section 234 stores data indicating the second DAM 312b in the register 221. Furthermore, the error recovery processing section 234 instructs the command executing section 231 to perform data read processing.

The command executing section 231 makes a read control signal READ_GATE active with timing of arrival of the head element unit 12 at the data sector 131b. Then, the data processing section 210 performs data processing on the read-out data sector 131b according to an instruction from the channel control section 220. This process is different from the above-described process in that the data processing section 210 processes read-out data using the second DAM 312b. More specifically, upon detecting the second DAM 312b, the data processing section 210 performs signal processing on the second user data section 313b, the CRCC 313, and the ECC 314 using the second DAM 312b as a reference.

The data processing section 210 buries predetermined, particular data in a portion corresponding to the first user data section 313a that could not be read out. The read data that have been processed by the data processing section 210 are transferred to the error correcting section 232. The error correcting section 232 performs error correction processing on the data including the portion where the particular data are buried. Error-corrected data are then transferred to the host 51 via the buffer 241 of the RAM 24, as described above.

Next, a read process that is executed on the split sector 131d will be described. Basically, in an ordinary read process on the split sector 131d, the above-described ordinary read process on the data sector 131b is executed two times repeatedly. The data processing section 210 is set in advance so that the first DAM 312a should be used for data processing on the first sector section 113e. Furthermore, the data processing section 210 uses the first DAM 316a for data processing on the second sector section 113f. The other part of the process is substantially the same as the above-described process that is executed on the data sector 131b and hence will not be described.

Next, a description will be made of an error recovery process that is executed when a DAM detection error has occurred in the split sector 131d. The error recovery processing section 234 performs retry processing which is exemplary error processing for coping with a DAM detection error.

As described above, the RW channel 21 processes read data using the DAM designated in advance. In the above example in which the one data sector has the only two DAMs 312a and 312b, the DAM 312b is the only DAM to be designated next by the error recovery processing section 234 when an error occurs in detecting the DAM 312a. Therefore, the data may be read out by a single piece of retry processing.

However, the split sector 131d has the four DAMs 312a, 312b, 316a, and 316b and the two DAMs 312a and 316a exist as default DAMs to be used in the first piece of processing. If it is unknown which of these DAMs has caused a detection error, the error recovery processing section 234 cannot uniquely determine a DAM to be used in the next retry processing. That is, the error recovery processing section 234 selects DAMs to be used in the next retry from three combinations of DAMs, that is, the DAMs 312a and 316b, the DAMs 312b and 316a, and the DAMs 312b and 316b. Three retry steps thus need to be executed at the maximum.

The maximum number of retry steps increases as the number of splits (sector sections) of a split sector increases. For example, where one data sector is split into three sections by two pieces of servo data, seven combinations are possible as a combination to be selected next upon occurrence of a DAM error. In general, (2×N−1) combinations are possible, where N is the number of splits that are produced by servo data. As described above, where a data sector is read out by using part (plural) of plural DAMs, a large number of retries need to be made if the position of a DAM that has caused a detection error cannot be located.

When detecting a DAM error, the above-described RW channel 21 identifies a DAM that has caused the error. The HDC/MPU 23 acquires, from the RW channel 21, data indicating the DAM that has caused the error, and determines, using the acquired data, DAMs to be used in the next retry step. Since the information of the DAM that has caused the detection error is acquired, the number of combinations of DAMs to be selected by the HDC/MPU 23 may be reduced.

Figure 6:
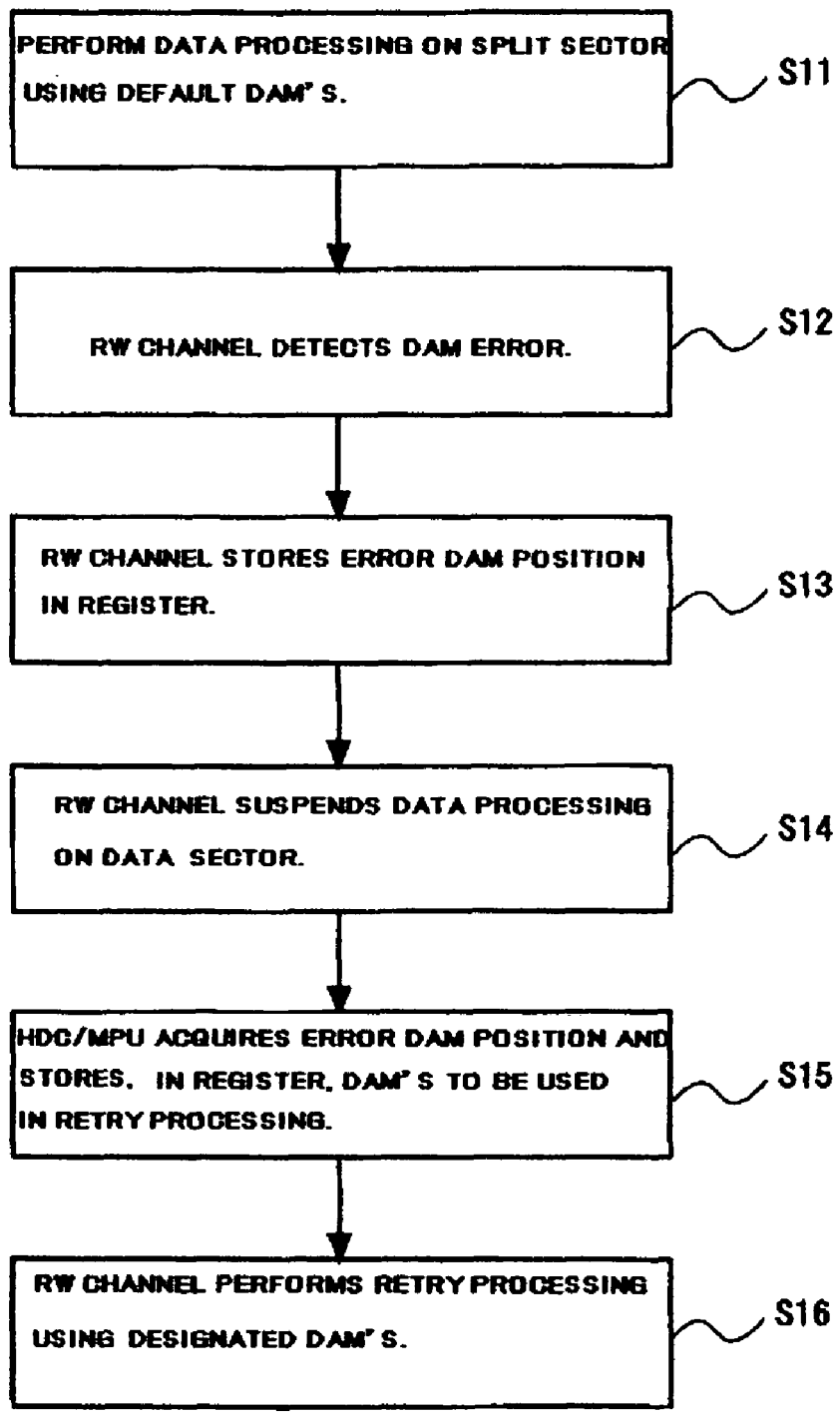
FIG. 6 is an exemplary flowchart in which read retry processing is performed by locating a DAM error position in accordance with one embodiment.

A DAM error recovery process for the split sector 113d will be described below in a specific manner with reference to FIGS. 3 and 4 and a flowchart of FIG. 6. A description will be made of an exemplary case that an error has occurred in detecting the first DAM 316a of the second sector section 131f. The data processing section 210 performs data processing on the read-out split sector 113d according to a read control signal READ_GATE which is supplied from the command executing section 231 (S11). More specifically, the channel control section 220 instructs the data processing section 210 to perform processing according to the read control signal READ_GATE. In performing the data processing, the data processing section 210 uses DAMs indicated by data that are stored in the register 221. In the first step, the first DAM 312a and the first DAM 316a are used.

When detecting an error in the first DAM 316a of the second sector section 131f (S12), the data processing section 210 suspends its processing and informs the channel control section 220 of the occurrence of the error and the DAM position where the error has occurred. For example, the data processing section 210 is equipped with a counter for counting the number of times of DAM detection and may thereby locate a DAM position where an error has occurred.

The channel control section 220 informs the HDC/MPU 23 of the fact of occurrence of the DAM error and stores, in the register 222, data indicating the DAM position where the error has occurred (S13). Because of the occurrence of the DAM error, the RW channel 21 suspends the data processing on the data sector 131d (S14). The error recovery processing section 234 acquires the data indicating the error DAM position from the register 222, and stores DAMs to be used in retry processing in the register 221 according to the acquired data (S15).

In this example, the data of the register 222 indicates the first DAM 316a of the second sector section 131f. The error recovery processing section 234 stores, in the register 221, data indicating that the first DAM 312a is used for the first sector section 131e and the second DAM 316b is used for the second sector section 131f. In retry processing, the data processing section 210 refers to the register 221 and performs data processing on read data using the first DAM 312a and the second DAM 316b that are designated in the register 221.

Although in the above example the data processing section 210 locates a DAM position where an error has occurred, the channel control section 220 may locate it. For example, the channel control section 220 is equipped with a timer and measures an elapsed time from the start of reading of the data sector 131d. A DAM position where an error has occurred may be located on the basis of an elapsed time from the start of the reading to reception of a DAM error notice from the data processing section 210.

In the above example, the RW channel 21 suspends the processing on user data in response to the occurrence of a DAM error. However, an alternative process is possible in which the data processing section 210 continues the read processing even in the event of a DAM error and checks whether each of the DAMs located behind the DAM that has caused the error may be detected. The data processing section 210 has detection timing of (i.e., timing to detect) each DAM that is preset with a read control signal READ_GATE as a reference. Each piece of preset timing has a certain width and is called a window. The data processing section 210 may check whether or not each DAM is detected by checking whether or not a DAM is detected in each detection window.

The data processing section 210 checks whether each of all the DAMs of the data sector or the sector section including the DAM that has caused a detection error is detected. Upon checking whether or not the last DAM of the data sector or the sector section is detected, the data processing section 210 suspends the data processing and informs the channel control section 220 of the occurrence of an error(s) and all DAM positions where an error occurred. This processing makes it possible to identify all DAMs that cause an error by a single piece of read processing.

Furthermore, the HDD 1 may perform reading for detecting error DAMs, which is different from ordinary read processing. More specifically, upon occurrence of a DAM error, the HDC/MPU 23 performs reading for an error DAM search of the sector or the sector section where the error has occurred.

In the error DAM search, the HDC/MPU 23 varies a read control signal READ_GATE in accordance with the servo data timing. This makes it possible to reliably prevent the read control signal READ_GATE from overlapping with a servo data region by means of the width of the window for checking whether or not each DAM is detected. The data processing section 210 checks whether or not each DAM is detected in the preset window within a time that is specified by the read control signal READ_GATE.

Next, a description will be made of another possible form of locating of a DAM position where a detection error has occurred. The channel control section 220 of this form is equipped with a counter for counting detected DAMs and counts detected DAMs in accordance with the variation of a read control signal READ_GATE that is supplied from the command executing section 231. The count of the counter serves to locate an error DAM position. The channel control section 220 stores the count in the register 222. Alternatively, the counter itself functions as the register 222.

An example shown in FIG. 7 will be described below in a specific manner. In this example, one data sector 400 is divided into four sector sections 401a-401d by three servo data 421a-421c. The respective sector sections 401a-401d have syncs 411a-411d, first and second DAMs 412a-412h, and first and second user data sections 413a-413h, respectively. The last sector section 401d has a CRCC 414 and an ECC 415.

First, a description will be made of an ordinary read process in which read processing on the data sector 400 is finished without occurrence of a DAM error. The data processing section uses the first DAMs of the respective sector sections 401a-401d as default DAMs. Symbols GOOD COUNTER and GOOD READ_GATE denote the count and a read control signal of the ordinary read process. The counter performs counting in response to rises of the read control signal READ_GATE. That is, the counter increments the count every time the read control signal READ_GATE becomes active.

Figure 7:
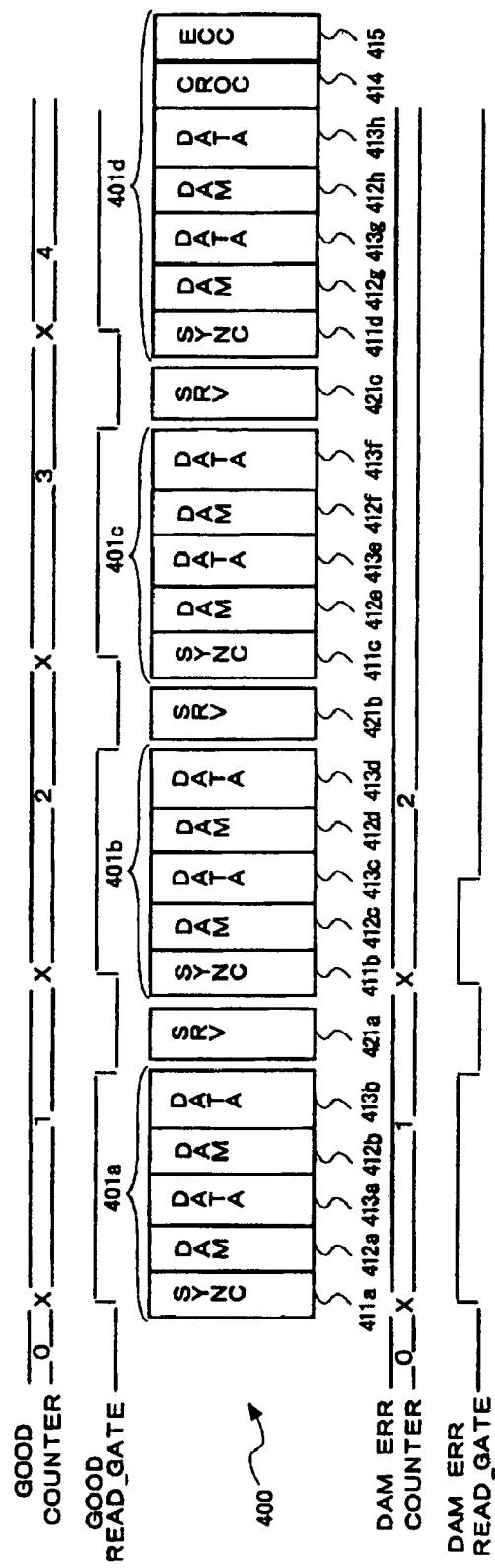
FIG. 7 schematically shows an exemplary data format of a split sector and a method for locating an error DAM position using a counter.

As shown in FIG. 7, in the ordinary read process, the read control signal GOOD READ_GATE becomes active at the starts of the respective sector sections 401a-401d and becomes inactive at their ends. The read control signal GOOD READ_GATE becomes active and the count GOOD COUNTER becomes "1" at the start of the sector section 401a. Subsequently, the read control signal GOOD READ_GATE becomes active and the count GOOD COUNTER is incremented so as to have values "2," "3," and "4" in order at the starts of the respective sector sections 401b-401d. The count comes to have the value "4" at the end of the read process for this data sector, which means that no DAM error has occurred.

On the other hand, symbols DAM ERR COUNTER and DAM ERR READ_GATE denote the count and a read control signal of a case that a detection error occurs in the first DAM 412c of the second sector section 401b. The read control signal DAM ERR READ_GATE is asserted at the start of the first sector section 401a and negated at its end. The read control signal is controlled by using, as a reference, the timing of detection of particular data in the servo data that immediately precedes the data sector concerned. The RW channel 21 measures an elapsed time from the timing of detection of the particular data in the immediately preceding servo data and asserts the read control signal with timing of a lapse of a predetermined time.

Then, the read control signal DAM ERR READ_GATE is asserted at the start of the second sector section 401b and negated in response to detection of an error in the first DAM 412c. The count DAM ERR COUNTER is incremented at every rise of the read control signal DAM ERR READ_GATE. Therefore, in this case, the count DAM ERR COUNTER finally has a value "2." The channel control section 220 stores this count in the register 222. The count DAM ERR COUNTER being equal to "2" means that a DAM error has occurred in the second sector section 401b. In the above example, it means that the error DAM position is the first DAM 412c. In this manner, providing the counter which uses a read control signal makes it possible to locate a DAM error position in a data sector by a simple configuration.

Figure 8:
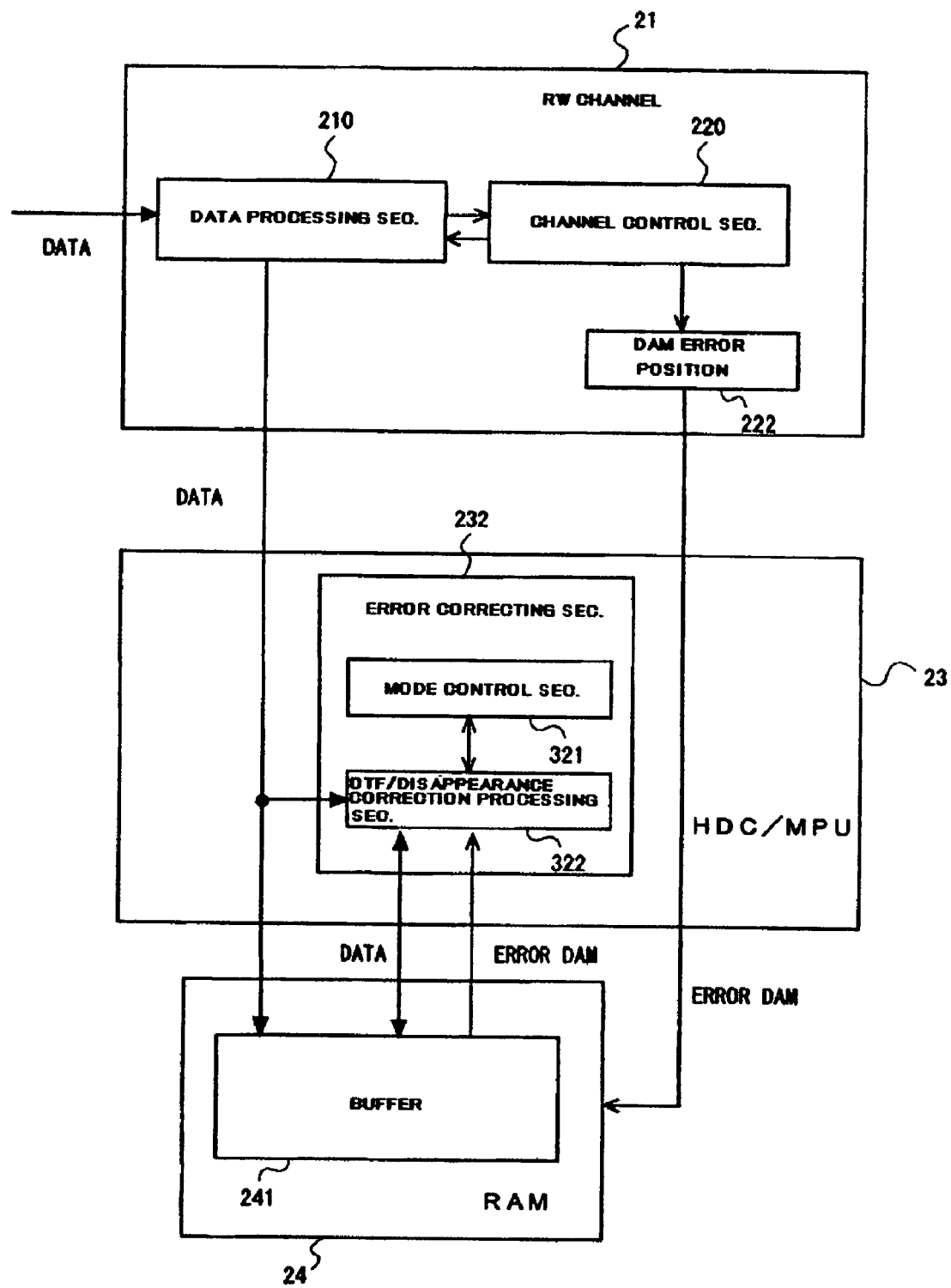
FIG. 8 is an exemplary block diagram schematically showing respective logic components that relates to an error correcting process using a DAM detection error position in a second embodiment.

The DAM selection in a retry step has been described above as an exemplary DAM error process of the HDC/MPU 23. In another preferable form, the HDC/MPU 23 may execute, as another DAM error process, an error correcting process on user data using data indicating a DAM error position. FIG. 8 is a block diagram schematically showing a configuration that relates to an error correcting process using a DAM error position.

An error correcting section 232 is provided with two modes, that is, an on-the-fly (OTF) mode for an online correcting process and a disappearance correction processing mode for an offline correcting process. In the initial setting, the error correcting section 232 is in the OTF mode. If OTF error correction is impossible, switching is made to the disappearance correction processing mode. More specifically, an OTF/disappearance correction processing section 322 performs substantive processing of error correction and a mode control section 321 controls its processing mode.

In the OTF mode, code words of a data sector are read in consecutively and user data are transferred to the host 51 consecutively while error correction is performed. The disappearance correction processing mode is employed when a code word that cannot be error-corrected, in the OTF mode is read in. The reading-in of code words and the transfer of user data are suspended and an error in the code word is corrected. After completion of the correction, the reading-in of code words and the transfer of user data are restarted. Information of a DAM position where an error occurred may be used in the disappearance correction processing mode.

The processing methods of the OTF mode and the disappearance correction processing mode are different from each other. Error correction in the disappearance correction processing mode may correct two times more errors than that in the OTF mode. In both of the OTF mode and the disappearance correction processing mode, error correction processing is performed by using a CRCC and an ECC that are transferred from the RW channel 21. For example, Reed-Solomon code that enables calculation on the Galois field GF ($2^8$) may be used as the ECC and the CRCC.

In the OTF mode, the OTF/disappearance correction processing section 322 calculates error data that consist of an error position and an error pattern on the basis of only code words of read data that are transferred from the data processing section 210. Then, the OTF/disappearance correction processing section 322 calculates a CRC syndrome using the read-in code words and the error data and judges, on the basis of the CRC syndrome, whether or not all the error data are correct. If all the error data are correct, the OTF/disappearance correction processing section 322 corrects the read-in code words according to the error data.

If the error data are not correct, the OTF/disappearance correction processing section 322 informs the mode control section 321 of that judgment result. Based on that information, the mode control section 321 switches the mode of the OTF/disappearance correction processing section 322 to the disappearance correction processing mode. The term "disappearance" means an error that may be corrected if an error pattern is known. In the disappearance correcting process, it is inferred that a position that should be an error position at a high probability is a disappearance position and error data are calculated on the basis of the disappearance position.

Where as described above the RW channel 21 uses a DAM selected from plural DAMs, user data located before a DAM that is used for data processing on read data cannot be read out correctly. In view of this, for example, the RW channel 21 buries predetermined, prescribed data at positions of user data located before a detected DAM position. Therefore, if a DAM position where an error has occurred is located, a disappearance position in the user data may be located.

More specifically, in the disappearance correction processing mode, the OTF/disappearance correction processing section 322 generates disappearance position data as data indicating a position that should be an error position at a high probability using a DAM position where an error has occurred. Then, the OTF/disappearance correction processing section 322 calculates error data on the basis of code words acquired from the data processing section 210 and the calculated disappearance position data. The OTF/disappearance correction processing section 322 calculates a CRC syndrome using the calculated error data and the code words. The OTF/disappearance correction processing section 322 may judge, using the CRC syndrome, whether or not all the error data are correct. If all the error data are correct, the OTF/disappearance correction processing section 322 corrects the code words according to the error data. If at least one piece of error data is not correct, the OTF/disappearance correction processing section 322 generates new disappearance position data and performs disappearance correction again. If disappearance correction is impossible, the process results in an error.

Figure 9:
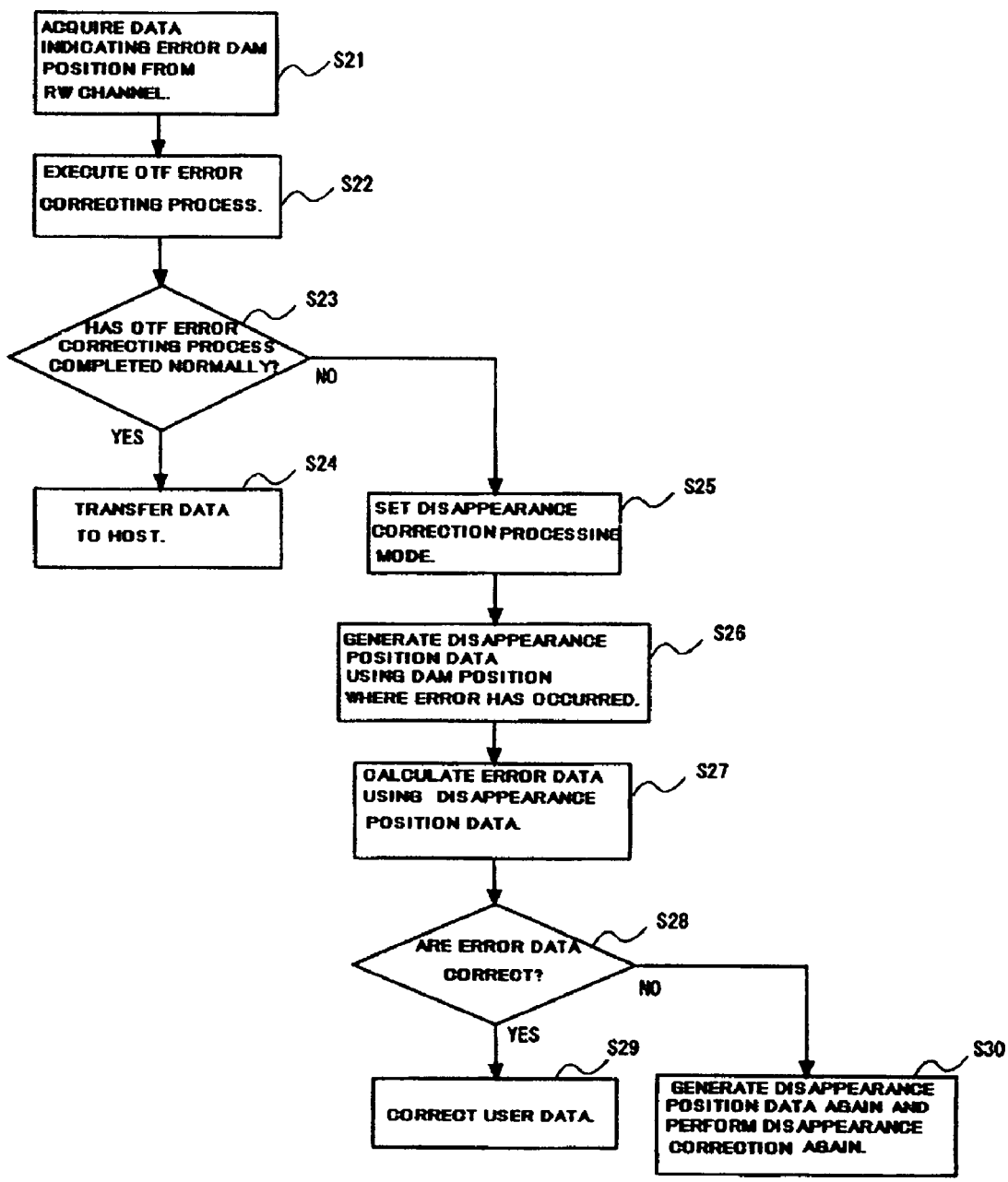
FIG. 9 is an exemplary flowchart showing the error correcting process using a DAM detection error position in the second embodiment.

Processing procedures of the individual functional sections in an error correcting process will be described below with reference to FIGS. 8 and 9. The HDC/MPU 23 acquires, from the register 222, data indicating a DAM position where an error has occurred, and stores the data in the RAM 24 (S21). The data processing section 210 stores user data, a CRCC, and an ECC in the buffer 241, and transfers those to the OTF/disappearance correction processing section 322. The OTF/disappearance correction processing section 322, which is set in the OTF mode, executes an OTF error correcting process on the received code words (S22). The OTF/disappearance correction processing section 322 corrects the user data stored in the buffer 241 into correct data.

If the error correcting process (OTF error correcting process) has completed normally (S23: yes), the data in the buffer 241 are transferred to the host 51 (not shown in FIG. 8) (S24). If the error correcting process cannot be executed normally (S23: no), the mode control section 321 sets the OTF/disappearance correction processing section 322 in the disappearance correction processing mode (S25).

In the disappearance correction processing mode, the OTF/disappearance correction processing section 322 generates disappearance position data indicating a position that should be an error position at a high probability using a DAM position where an error has occurred (S26). Then, the OTF/disappearance correction processing section 322 calculates error data using code words acquired from the RW channel 21 and the calculated disappearance position data (S27). The OTF/disappearance correction processing section 322 judges whether or not the error data are correct. If the error data are correct (S28: yes), the OTF/disappearance correction processing section 322 corrects the user data that are stored in the buffer 241 (S29). If the data are not correct (S28: no), the OTF/disappearance correction processing section 322 generates disappearance position data again and performs disappearance correction again (S30). If disappearance correction is impossible, the correcting process is finished.

In another exemplary DAM error process, the HDC/MPU 23 may register defects in a defect table using information of DAM positions where detection errors occurred and perform defect management using the registered defects. The HDC/MPU 23 registers, as defective sectors, in the defect table, data sectors from which data cannot be read out correctly. In addition to the data sectors which caused errors, the HDC/MPU 23 registers, as defective sectors, data sectors on other tracks. A sector that is registered as a defective sector will no longer be used (unused sector) and data concerned are recorded in another sector (spare sector) that is reassigned to a corresponding address.

It is highly probable that a defect in one DAM region is not localized there but extends to DAM regions of adjacent sectors. It is also highly probable that such a defect will grow with age and an error that is currently detected as a soft error which is repairable will turn to a hard error which disables data reading in future. In view of this, not only a data sector whose DAM cannot be detected but also adjacent sectors that should also be defective at a high probability are subjected to replacement processing as defective sectors, whereby occurrence of a soft error or a hard error in other sectors may be prevented.

For example, the HDC/MPU 23 registers, as defective sectors, a data sector where an error has occurred and data sectors that are on the data tracks adjacent to the former data sector in the radial direction and are located in prescribed ranges. In doing so, the HDD may determine data sectors to be registered as defective sectors using a DAM position where a detection error has occurred. For example, the HDC/MPU 23 registers, as defective sectors, both data sectors that are adjacent to, in the radial direction, a data sector where an error has occurred. Furthermore, data sectors close to the DAM position where the error has occurred may also be registered as defective sectors. For example, where an error has occurred at a rear DAM position, the data sector immediately behind the adjacent data sector may be registered as a defective sector.

Although the preferred embodiments of the invention have been described above as examples, the invention is not limited to the above embodiments. Those skilled in the art may easily modify, convert, or make addition to each feature of the embodiments without departing from the scope of the invention. For example, the application range of the invention is not limited to magnetic disk devices, but encompasses data storage devices using other types of media.

Although in the above examples each data sector or each sector section has two DAMs, the invention may also be applied to a case that it has three or more DAMs. Embodiments of the present invention may be applied to not only split sectors but also data sectors having three or more DAMs. In executing an error process for coping with a DAM detection error, the HDD may use the above examples together or individually. Although in the above examples the RW channel locates an error position, the HDC/MPU may locate an error position and execute an error process for coping with the error using the error position thus located.

What is claimed is:

1. A data storage device for reading out user data from a medium on which user data are recorded comprising:
    a channel circuit for performing data processing on the user data by specifying a start position of user data using part of data address marks that are included in the data sector and located at different positions in read processing on a data sector; and
    a controller for executing an error process on the basis of a position of a data address mark that is judged to have caused a detection error when the error has occurred in the channel circuit's detecting the part of the data address marks in the read processing.

2. The data storage device according to claim 1, wherein:
    the channel circuit specifies the position of the data address mark that has caused the error when the error has occurred in detecting the part of the data address marks; and
    the controller acquires data indicating the position from the channel circuit and executes the error process using the acquired data.

3. The data storage device according to claim 1, wherein:
    the controller designates a data address mark that is different in position from the data address mark that has caused the error as a data address mark to be used for locating a start position of the user data in the error process; and
    the channel circuit reads out the data sector again using the data address mark that is located at the position specified by the controller.

4. The data storage device according to claim 1, wherein:
    the data sector is divided into plural sections by one piece or plural pieces of servo data;
    each of the divisional sections includes plural data address marks in itself; and
    the channel circuit specifies a start position of user data using part of the plural data address marks in each section and performs data processing on the user data.

5. The data storage device according to claim 4, wherein:
    the controller designates a data address mark that is different in position in the same section from a data address mark that has caused an error as a data address mark to be used for locating a start position of the user data in a section in the error process; and
    the channel circuit reads out the data sector again using the data address mark that is located at the position specified by the controller.

6. The data storage device according to claim 4, wherein the position of the data address mark that has caused the detection error is specified on the basis of the number of times of variation, in one data sector, of a read control signal which is output from the controller to the channel circuit and varies on a section-by-section basis.

7. The data storage device according to claim 6, wherein:
    the channel circuit comprises a counter for counting the number of times of variation of the read control signal and specifies the position of the data address mark that has caused the detection error in accordance with a resulting count; and
    the controller acquires data indicating the position of the data address mark that has caused the detection error from the channel circuit, and executes the error process using the acquired data.

8. The data storage device according to claim 1, wherein the controller executes an error correcting process on the user data on the basis of the position of the data address mark that has caused the detection error.

9. The data storage device according to claim 1, wherein the channel circuit further makes a search as to whether or not a detection error occurs in detecting data address marks that are different from the data address mark that has caused the detection error.

10. The data storage device according to claim 9, wherein the channel circuit makes a search as to whether or not a detection error occurs in detecting data address marks that are different from the data address mark that has caused the detection error by reading again the data sector including the data address mark that has caused the detection error.

11. An error processing method in data reading from a medium on which user data are recorded comprising the steps of:
    specifying a start position of user data using part of data address marks that are included in the data sector and located at different positions and performing data processing on the user data in read processing on a data sector;
    specifying a position of a data address mark that has caused an error when the error has occurred in detecting the part of the data address marks in the read processing; and
    making a retry of reading of the data sector using a data address mark that is different in position from the position-located data address mark.

12. The method according to claim 11, wherein the data sector is divided into plural sections by one piece or plural pieces of servo data, and each of the divisional sections includes data address marks that are located at different positions, the method comprising the steps of:

specifying a start position of user data using part of the plural data address marks in each section, and performing data processing on the user data; and identifying the data address mark that has caused the detection error when an error has occurred in detecting a data address mark in one section, and using a data address mark that is different from the identified data address mark in reading the section in the retry.

13. The method according to claim 12 further comprising the step of;

counting the number of times of variation in one data sector of a read control signal which varies on a section-by-section basis, and specifying a position of the data address mark that has caused the detection error in accordance with a resulting count.

* * * * *